United States Patent Office 2,767,989
Patented Oct. 23, 1956

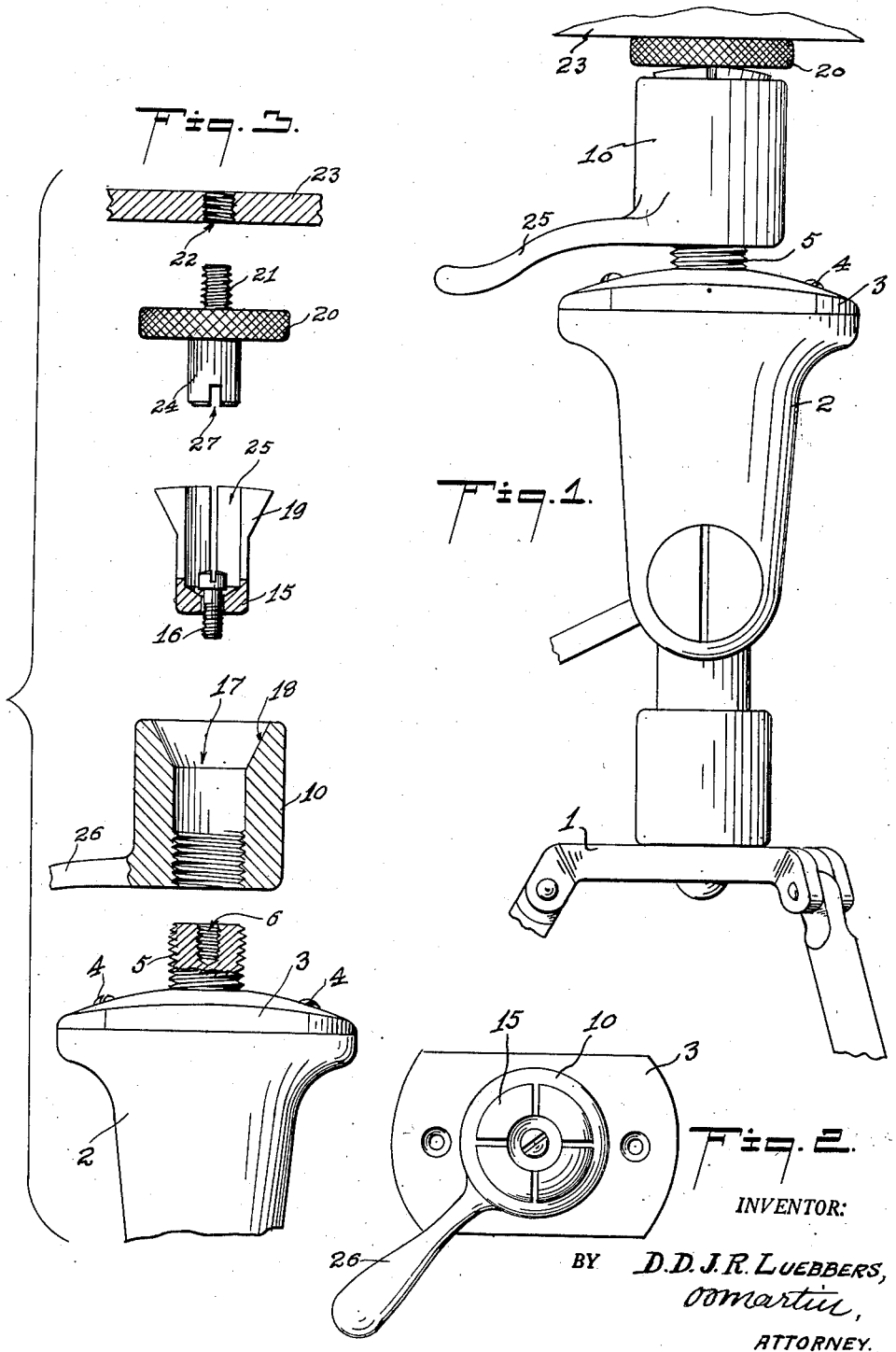

2,767,989

TRIPOD CAMERA MOUNT

Dewey D. J. R. Luebbers, North Hollywood, Calif.

Application July 16, 1954, Serial No. 443,831

4 Claims. (Cl. 279—48)

This invention relates to a device for mounting a camera on a tripod.

Cameras are for this purpose generally provided with a threaded socket in the bottom surface thereof for engagement by a threaded stud rising from the tripod. While this simple arrangement will satisfactorily support the camera on the tripod, it is difficult to manipulate the parts correctly to enter the stud into the socket of the camera and relatively to rotate the parts. The screw threads are fine and soon become upset unless the work is painstakingly done and so fail to maintain the camera firmly in position on the tripod. Attempts have been made to overcome this difficulty by substituting clamping means for the interengaging screw threads above referred to and in devices of this type that have come to my notice such clamping means includes a stud permanently seated in and projecting from the bottom surface of the camera. This is objectionable when the camera is used without the tripod in that it then becomes impossible to set the camera on a flat surface for focusing or any other purpose.

It is in view of the foregoing the object of my invention to provide a camera mounting device which overcomes these difficulties. A further object is to provide a device which is convenient to operate and which may be depended upon to maintain the camera rigidly clamped in any desired position on the tripod.

The manner in which the objects of the invention are attained is hereinafter fully described and drawings are hereto appended in which a preferred form of the invention is illustrated.

In the drawings:

Fig. 1 is a side elevational view illustrating the manner in which the device of the invention mounts a camera on a tripod;

Fig. 2 is a corresponding plan view of the device substantially as it appears in Fig. 1; and Fig. 3 is an extended view illustrating the component parts of the device.

The device of the invention consists of two parts, one of which in the drawings is shown mounted on the tilting head 2 of a tripod 1, such as commonly employed to support cameras. This part of the device comprises a base plate 3 which by screws 4 is rigidly clamped in position on the tripod head and a threaded stud 5 rises from the center of this base plate, in addition to which a threaded socket 6 is axially sunk into the stud. The lower portion of a sleeve 10 is at 11 shown internally threaded to engage the screw threads of the stud 5 and it is entered on this stud until seated thereon. The upper portion 17 of the sleeve is shaped to receive therein a chuck member 15, whereupon a screw 16 is seated in the member for advancement into the threaded socket 6 of the base plate 3 to lock the member rigidly in position thereon. This member is shaped like conventional collet chucks and the upper end of the sleeve is at 18 shown outwardly flared fittingly to receive the conical head 19 of the member. This completes the portion of the device which is mounted on the tripod.

The other part of the device takes the shape of a cylindrical member 20, the upper portion of which is reduced in diameter to form a threaded stud 21 of a size to engage the threaded socket 22 of a camera 23. The lower portion 24 of the member is cylindrical in shape and of a diameter freely to seat in the recess 25 of the chuck member, whereupon the sleeve 10 may be rotated to advance its flared seat 18 against the conical head 19 of the chuck member thereby to compress the latter rigidly to clamp the cylindrical portion of the member 20 in position therein. The camera is now securely mounted in position on the tripod but it can be released for rotation thereon as may be required for focusing purposes by a slight reverse rotation of the sleeve. The latter may for this purpose be fitted with a handle 26. This is of particular advantage in connection with simpler types of tripods not provided with a rotatable head.

The member 20, which for the sake of clearness may be termed the connector of the device, is very simple and inexpensive; it is convenient and easy to seat in the camera and it may, as indicated at 27 in Fig. 3, be slotted to provide a seat for a screwdriver or any available piece of material by means of which the connector may be rotated for attachment to or removal from the camera. When not in use, it may be held clamped in the chuck member until again needed.

It is seen from the foregoing description that I have devised a very simple camera mounting device which may readily be attached to the type of head commonly found on camera tripods. In cases of simple tripods which are not fitted with such heads it is a simple matter to redesign the platform of the tripod to form a seat for the base or to provide it with a threaded stud, similar to the stud 5 of the device. Other modifications may be embodied in the device without departing from the principle of the invention as set forth in the appended claims.

I claim:

1. A device for mounting a camera on a tripod, the camera having a threaded socket in the bottom surface thereof, said device comprising, a threaded stud on the tripod, a collet chuck member mountable on the end of said stud, the chuck having a cylindrical recess in the upper end thereof, a connector having one end thereof seatable in the threads of the camera socket, the other end of the connector being cylindrical and of a diameter freely to seat in the recess of the chuck member, and means seated on the threads of the stud for clamping the cylindrical portion of the connector in position in the member.

2. A device for mounting a camera on a tripod having a flat top surface, the camera having a threaded socket in the bottom surface thereof, said device comprising, a base plate mountable on the tripod surface, a threaded stud rising from the base plate, a collet chuck member mounted on said stud, a connector terminating at one end thereof in a cylindrical portion of a diameter freely to seat in the collet chuck member, the other end of the connector being threaded to engage the threads of the camera socket, and a sleeve on the threads of the stud manually rotatable tightly to clamp the connector in position in the member.

3. A device for mounting a camera on a tripod having a flat top surface, the camera having a threaded socket in the bottom surface thereof, said device comprising, a base plate mountable on the tripod surface, said plate having a threaded stud rising from the center thereof, a collet chuck member seatable on the stud, means for clamping the member in position on the stud, a connector terminating at one end thereof in a cylindrical portion of a diameter freely to seat in the collet chuck member, the other end of the member being threaded to engage the threads of the camera socket, and a sleeve seated on the threads of the stud and manually operable tightly to clamp the connector in position in the member.

4. A device for mounting a camera on a tripod having a flat top surface, the camera having a threaded socket in the bottom surface thereof, said device comprising, a base plate mountable on the tripod surface, said plate having a threaded stud rising from the center thereof, the stud having a threaded socket therein, a collet chuck member seatable on the stud, a screw seated in the member for engagement with the threads of said socket to lock the member in position on the stud, a connector terminating at one end thereof in a cylindrical portion of a diameter freely to seat in the collet chuck member, the other end of the member being threaded to engage the threads of the camera socket, and a sleeve on the threaded stud, said sleeve being manually rotatable thereon tightly to clamp the connector in position in the member.

References Cited in the file of this patent

UNITED STATES PATENTS

| | | |
|---|---|---|
| 1,438,391 | Mutter | Dec. 12, 1922 |
| 2,318,633 | Ries | May 11, 1943 |